United States Patent
Nara et al.

[15] 3,668,071
[45] June 6, 1972

[54] PROCESS FOR PRODUCING INOSINE

[72] Inventors: Takashi Nara, Tokyo; Masanaru Misawa, Kawasaki-shi; Toshio Komuro, Machida-shi, all of Japan

[73] Assignee: Kyowa Hakko Kogyo Co., Ltd., Tokyo, Japan

[22] Filed: July 12, 1968

[21] Appl. No.: 744,295

Related U.S. Application Data

[63] Continuation of Ser. No. 565,105, July 14, 1966, abandoned.

[30] Foreign Application Priority Data

July 20, 1965    Japan...................................40/43402

[52] U.S. Cl. .........................................................195/28 N
[51] Int. Cl. ......................................................C12d 13/06

[58] Field of Search .................................................195/28 N

[56] References Cited

UNITED STATES PATENTS 3,152,966  10/1964   Kinoshita et al. .....................195/28 N
3,268,415  8/1966    Kinoshita et al. .....................195/28 N
3,359,177  12/1967   Nara et al. ............................195/28 N

*Primary Examiner*—Alvin E. Tanenholtz
*Attorney*—Craig, Antonelli & Hill

[57] ABSTRACT

An improvement in a fermentation process for producing inosine. A microorganism belonging to Brevibacterium or Corynebacterium is cultured in an aqueous nutrient medium containing hypoxanthine or natural substances containing the same.

12 Claims, No Drawings

PROCESS FOR PRODUCING INOSINE

CROSS-REFERENCE TO RELATED APPLICATION

This application is a continuation of copending application Ser. No. 565,105, filed on July 14, 1966 which is now abandoned.

This invention relates to a process for producing inosine. More particularly, it relates to a process for the production of inosine by fermentation. Even more particularly, the invention relates to a process for the production of inosine by fermentation with certain microorganisms in the presence of hypoxanthine.

Inosine is hypoxanthine riboside and has the formula $C_{10}H_{12}NO_5$. Inosine has been found in meat and meat extracts and in sugar beets. Inosine has been prepared from adenosine by incubation with purified adenosine deaminase from the intestine and also by the action of sodium nitrite and acetic acid on adenosine. However, it would be advantageous to have available a convenient fermentation process for the production thereof.

One of the objects of the present invention is to provide an improved process for the production of inosine.

Another object of the present invention is to provide a process for producing inosine by fermentation which may be carried out in an efficacious an simple manner.

A further object of the invention is to provide a process for producing inosine by fermentation which gives the product in high purity and good yield.

A still further object of the invention is to provide a process for producing inosine by fermentation which may be carried out advantageously on an industrial scale at low cost to give a high yield of product.

These and other objects and advantages of the present invention will become apparent to those skilled in the art from a consideration of the following specification and claims.

In accordance with the present invention, it has been found that remarkably large quantities of inosine are accumulated in the fermentation liquor and may be recovered therefrom if fermentation is carried out with the use of microorganisms belonging to the genus Brevibacterium or the genus Corynebacterium and hypoxanthine, natural substances containing hypoxanthine, appropriate substitutes therefor or a culture liquor containing hypoxanthine is added to the culture medium.

The strains to be employed in accordance with the present invention are the inosine-producing strains of Brevibacterium or Corynebacterium.

Although the particular characteristic of the present invention is to conduct the fermentation in the presence of hypoxanthine, it is to be understood that other nutrient sources conventionally used in the art in such fermentation processes are also to be employed therewith. Thus, either a synthetic culture medium or a natural nutrient medium is suitable in the present invention as long as it contains the essential nutrients for the growth of the strain employed. Such nutrients are well known in the art and include substances such as a carbon source, a nitrogen source, inorganic compounds, and the like which are utilized by the microorganism employed in appropriate amounts. Thus, as a carbon source, there may be mentioned, by way of example, carbohydrates such as glucose, fructose, maltose, sucrose, mannose, starch, starch hydrolysate, molasses, etc. A single carbon source may be used, or a mixture of two or more than two may also be employed. As a nitrogen source, various kinds of inorganic or organic salts or compounds, such as urea or ammonium salts such as ammonium chloride, ammonium sulfate, ammonium nitrate, ammonium phosphate, etc., or natural substances containing nitrogen, such as cornsteep liquor, yeast extract, meat extract, peptone, fish meal, casein hydrolysates, casamino acids, fish solubles, rice bran extract, etc. may be employed. The nitrogen source may either be a single substance or a mixture of two or more of such substances. Inorganic compounds which may be added to the culture medium include magnesium sulfate, sodium phosphate, potassium dihydrogen phosphate, potassium monohydrogen phosphate, iron sulfate or other iron salts, sodium chloride, calcium chloride, or other suitable calcium, manganese, zinc or other metal salts.

Hypoxanthine may be added to the culture medium all at one time either at the beginning of culturing or during culturing. Alternatively, the hypoxanthine may be added intermittently during culturing. As stated above, for example, the fermentation liquor of microorganisms having the capability of producing hypoxanthine may also be used as the source thereof. It is to be understood that the term "hypoxanthine" herein is intended to include such substances, such as natural substances or culture liquors, which contain this compound.

The amounts of hypoxanthine to be added, most optimal for inosine production, are from about 1 to 4 mg/ml.

The fermentation is conducted under aerobic conditions, such as aerobic shaking of the culture or with stirring of a submerged culture, at a temperature of about 20° to 40° C. and a pH of about 3 to 9. Adjustment of the pH of the culture medium during the fermentation can be effected by employing neutralizing agents such as aqueous ammonia, sodium hydroxide and the like. After 2 to 8 days of culturing, remarkably large quantities of inosine are accumulated in the culture medium and in the cell bodies themselves.

After the completion of culturing, the cells are removed and the filtrate is treated in a conventional manner in order to recover the inosine produced, such as ion exchange resin treatment as shown in Example 1 below or by other conventional techniques such as adsorption, extraction with solvents, precipitation with metallic salts, chromatography, and the like.

The following examples are given merely as illustrative of the present invention and are not to be considered as limiting. Unless otherwise noted, the percentages therein are by weight per liter of water.

EXAMPLE 1

*Brevibacterium vitarumen* ATCC 10234 is used as the seed strain. This bacterium is cultured in a culture medium consisting of 2 percent of glucose, 1 percent of peptone, 1 percent of yeast extract, 0.25 percent of NaCl and 30 µg/l of biotin at 30° C. for 24 hours. The pH of the seed medium is adjusted to 7.3 before sterilization thereof.

The resultant seed medium is inoculated in a ratio of 10 percent by volume into the following fermentation composition:

10 % glucose
1.2 % yeast extract
0.4 % $K_2HPO_4$
0.3 % $KH_2PO_4$
0.3 % $MgSO_4·7H_2O$
0.01 % $CaCl_2·6H_2O$
0.35 % hypoxanthine
0.6 % urea The urea was separately sterilized. The pH of the fermentation medium is adjusted to 8.2 with 5N NaOH before sterilization thereof. Then, 30 ml. portions of the mixture of medium are poured into 250 ml. conical flasks, respectively, and sterilized. Culturing is then carried out with aerobic shaking at 30° C. After 120 hours of culturing, 6.7 mg/ml. of inosine is accumulated in the fermentation liquor.

The fermentation liquor is filtered to remove the bacterial cells therefrom. One liter of the filtrate thus obtained is passed through a column packed with Dowex 50 (trade name) in the $NH_4$ form to adsorb the produced inosine. After washing with water, the inosine is eluted with a 0.01N ammonium hydroxide solution. A fraction containing inosine is concentrated under reduced pressure and cooled to obtain 5.9 grams of impure crystalline inosine. After recrystallization, elemental analysis, base sugar and ribose analyses, ultraviolet ray absorption and the $R_f$ value obtained by paper chromatography show that the resultant compound is a pure substance.

EXAMPLE II

*Brevibacterium ammoniagenes* ATCC 15312 (adenine-requiring strain) as a seed bacterium is cultured in a seed medium consisting of 10 percent of glucose, 0.3 percent of meat extract, 2.5 percent of rice bran extract solution, 5 $\mu$g/ml. of adenine, 30 $\mu$g/l of biotin, 50 $\mu$g/l of $MnSO_4 \cdot 4H_2O$, 0.1 percent of $K_2HPO_4$, 0.1 percent of $KH_2PO_4$, 0.05 percent of $MgSO_4 \cdot 7H_2O$ and 0.6 percent of urea. The pH of the seed medium is 8.0 before sterilization. Under the same conditions as described in Example I, 8.2 mg/ml. of hypoxanthine is found to be accumulated in the fermentation liquor after culturing has been carried out for 80 hours.

The solution obtained by removing the cell bodies from the fermentation liquor is diluted with water to give a concentration of 4 mg/ml. of hypoxanthine. Then, a mixture of 8 percent of glucose, 0.5 percent of urea, 0.2 percent of $K_2HPO_4$, 0.3 percent of $KH_2PO_4$, 0.2 percent of $MgSO_4 \cdot 7H_2O$ 30 $\mu$g/l of biotin, 0.5 percent of yeast extract and 0.2 percent of cornsteep liquor is added to the hypoxanthine solution. The same seed bacterium as employed in Example I (*Brevibacterium vitarumen* ATCC 10234) is cultured in the thus prepared fermentation medium under the same culturing conditions as described in Example I. After 96 hours of culturing 7.3 mg/ml. of inosine is found to be accumulated in the fermentation liquor.

EXAMPLE III

*Corynebacterium oleophilus* No. 1399 ATCC 19556, a natural isolate, is employed as the seed bacterium. Culturing is carried out under the same conditions as described in Example I. After 120 hours of culturing, 3.5 mg/ml. of inosine is accumulated in the fermentation liquor.

The microorganisms employed in the previous examples have been deposited in the American Type Culture Collection in Rockville, Maryland.

The invention being thus described, it will be obvious that the same may be varied in many ways. Such variations are not to be regarded as a departure from the spirit and scope of the invention and all such modifications as would be obvious to one skilled in the art are intended to be included herein.

What is claimed is:

1. In a fermentation process for the production of inosine by culturing a microorganism capable of producing inosine and belonging to the genus Brevibacterium or Corynebacterium in an aqueous nutrient medium under aerobic conditions, accumulating inosine in the resultant culture liquor, and recovering the inosine from the culture liquor, the improvement which comprises adding to said medium a substance selected from the group consisting of hypoxanthine and natural substances containing hypoxanthine.

2. The process of claim 1, wherein said substance is added to the medium prior to the initiation of culturing.

3. The process of claim 1, wherein said substance is added to the medium during culturing.

4. The process of claim 1, wherein said natural substance is a culture liquor containing hypoxanthine.

5. The process of claim 1, wherein said substance is added to the medium in an amount of from 1 to 4 mg/ml.

6. The process of claim 5, wherein culturing is carried out at a temperature of about 20° to 40° C. and at a pH of about 3 to 9 and said microorganism is *Brevibacterium vitarumen* ATCC 10234.

7. The process of claim 5, wherein culturing is carried out at a temperature of about 20° to 40° C. and at a pH of about 3 to 9 and said microorganism is *Corynebacterium oleophilus* ATCC 19556.

8. A process for producing inosine which comprises culturing a microorganism capable of producing inosine and belonging to the genus Brevibacterium or Corynebacterium in an aqueous nutrient medium containing a source of carbon and nitrogen under aerobic conditions in the presence of a substance selected from the group consisting of hypoxanthine and natural substances containing hypoxanthine and recovering the resultant inosine from the fermentation liquor.

9. The process of claim 8, wherein culturing is carried out at a temperature of from about 20° to 40° C. and a pH of from about 4 to 9.

10. The process of claim 9, wherein said microorganism is *Brevibacterium vitarumen* ATCC 10234.

11. The process of claim 9, wherein said microorganism is *Corynebacterium oleophilus* ATCC 19556.

12. The process of claim 9, wherein said natural substance is a culture liquor obtained by culturing *Brevibacterium ammoniagenes* in an aqueous nutrient medium under aerobic conditions.

* * * * *